United States Patent [19]
Silverberg et al.

[11] Patent Number: 5,869,909
[45] Date of Patent: Feb. 9, 1999

[54] ACTIVE GROUND COMPENSATION

[75] Inventors: Michael H. Silverberg, Livingston; Woodson Dale Wynn, Basking Ridge, both of N.J.

[73] Assignee: ATT Corp—Lucent Technologies Inc, Middletown, N.J.

[21] Appl. No.: 854,005

[22] Filed: May 8, 1997

[51] Int. Cl.$^6$ .................................................... H02J 1/02
[52] U.S. Cl. .................. 307/89; 307/105; 333/12
[58] Field of Search .................. 307/89, 326, 102, 307/327, 100, 105; 327/384, 551, 552; 333/12; 363/39, 36

[56] References Cited

U.S. PATENT DOCUMENTS

| | | |
|---|---|---|
| 4,199,989 | 4/1980 | Forard et al. . |
| 4,311,964 | 1/1982 | Boykin . |
| 4,479,215 | 10/1984 | Baker . |
| 4,510,611 | 4/1985 | Dougherty . |
| 5,257,006 | 10/1993 | Graham et al. . |
| 5,321,318 | 6/1994 | Montreuil .................................. 307/326 |
| 5,391,932 | 2/1995 | Small et al. . |
| 5,416,688 | 5/1995 | Levin ......................................... 363/39 |
| 5,640,314 | 6/1997 | Glasband et al. .......................... 363/36 |
| 5,666,255 | 9/1997 | Meulleman ................. 363/39 |
| 5,726,504 | 3/1998 | Pecukonis et al. ........................ 363/39 |

OTHER PUBLICATIONS

"Power–Line Carrier Systems", Authors:T.M. Swingle & H.I. Dobson, Chapter 14, pp. 14–19.

"A Model For Communication Signal Propagation On Three Phase Power Distribution Lines", Authors: M.E. Hardy,S. Ardlan, J.B. O'Neal, Jr., L.J. Gale & K.C. Shuey, IEEE Transactions on Power Delivery, vol. 6, No. 3, Jul. 1991, pp. 966–972.

"Decoupling Networks For Promoting Power Line Carrier Systems"; Author: K.S. Murthy; IEEE Transactions on Power Delivery, vol. 10, No. 2, Apr. 1995, pp. 580–587.

"Power Line Noise Survey", Author: A. A. Smith, Jr., IEEE Transactions On Electromagnetic Compatibility, vol. T–EMC, Feb. 1972, pp. 31–32.

"Transmission Lines and Waveguides"; Author: R.V. Lowman, of book; Chapter 42, pp. 42–1—42–6.

"Coupled Transmission Line Networks in an Inhomogeneous Dielectric Medium"; Authors: G.I. Zysman & A.K. Johnson, IEEE Transactions on Microwave Theory and Techniques, vol. MTT–17, No. 10, Oct. 1969, pp. 753–759.

"IEEE Guide for Power–Line Carrier Applications", Institute of Electrical and Electronics Engineers, NY, NY, Committe of IEEE Power Eng. Society; Sponsor: Power System Communications, IEEE Standard 643–1980, Jan. 30, 1981, ANSI, pp. 2–63.

*Primary Examiner*—Richard T. Elms

[57] ABSTRACT

A ground voltage reduction device is connected between a neutral reference node and a ground node defined by two bypass capacitors of a blocking circuit. The ground voltage reduction device senses the voltage difference between the neutral reference node and the ground node and drives the ground node to reduce the voltage difference between a voltage of the ground node and a voltage of the neutral reference node.

16 Claims, 8 Drawing Sheets

ACTIVE GROUND COMPENSATION

BACKGROUND OF THE INVENTION

1. Field Of Invention

This invention relates to improving blocking circuit performance in a power line communication system.

2. Description Of Related Art

Conventional power line signal receivers block noise generated by devices connected to the power supply lines of a house by using a blocking circuit. Such blocking circuits reduce noise voltages generated by devices such as home appliances from interfering with signal receivers receiving signals through the power lines.

Because power lines connected to houses have three lines where the voltage between a positive power line and a negative power line is about 240 volts, home appliances that require only 120 volts are connected between one of the positive and negative power lines and a neutral line. Thus, noise voltages are generated across the positive and negative power lines independently causing a net difference voltage between the positive and negative power lines.

The above noise voltage across the positive and negative power lines are only partially removed by the blocking circuit. Thus, there is a need to improve the blocking circuit performance for further reducing the noise induced onto power lines by devices such as home appliances.

SUMMARY OF THE INVENTION

The invention provides a ground voltage reduction device that improves a blocking circuit performance to reduce power line noise by maintaining a voltage of a ground node of the blocking circuit substantially equal to a voltage of a neutral reference node of a neutral line of a house, for example. The ground voltage reduction device is connected between the neutral reference node and the ground node defined by two bypass capacitors of the blocking circuit connected between a positive power supply line and a negative power supply line. The ground voltage reduction device senses the voltage difference between the neutral reference node and the ground node and drives the ground node to significantly reduce the voltage difference between the ground node and the neutral reference node.

Because the voltage of the ground node is maintained to be substantially equal to the voltage of the neutral reference node, each of the shunting capacitors in the blocking circuit is able to independently remove noise generated between the positive and negative power lines and the neutral reference node. Thus, the noise voltages generated by house noise sources are effectively blocked from affecting the power supply lines used by the power line communication system.

BRIEF DESCRIPTION OF THE DRAWINGS

The invention is described in connection with the following figures wherein like numerals reference like elements, and wherein.

DETAILED DESCRIPTION OF PREFERRED EMBODIMENTS

Figure 1:
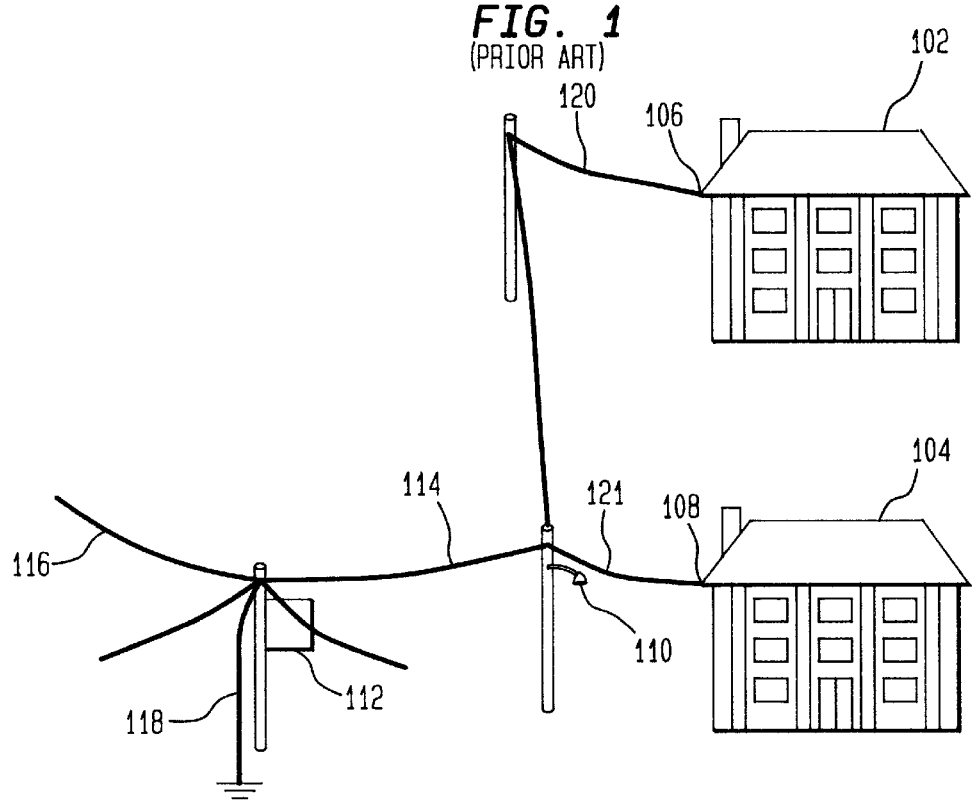
FIG. 1 is a diagram of connections from power lines to houses.

FIG. 1 shows a typical power line connection to houses 102 and 104. The high voltage power line 116 is connected to a power line transformer 112. The power line transformer has one primary coil connected to the high voltage power line 116 and two secondary coils which are connected together. The connecting point between the two secondary coils is grounded by a ground connection 118. The secondary coils provide a positive power supply line and a negative power supply line which are strung across power line poles as power lines 114. These power lines 114 supply power to the houses 102 and 104 as well as to street lamps such as street lamp 110. Each of the houses 102 and 104 are connected to the power line 114 by power lines 120 to a header connection 106 for house 102 and power lines 121 to a header connection 108 for house 104.

Figure 2:
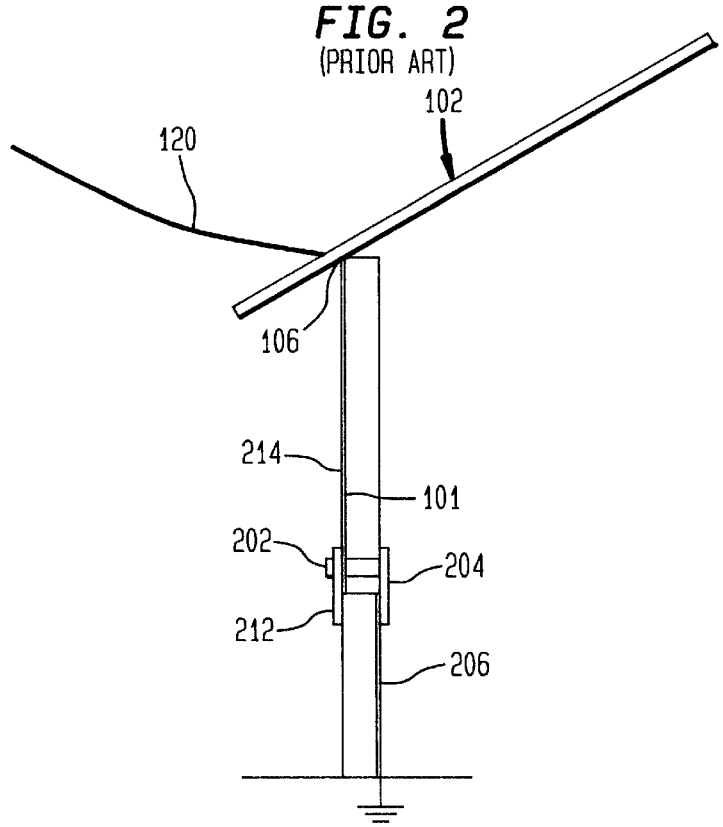
FIG. 2 shows the power line connection to a power meter of a house.

FIG. 2 shows the header connection 106 for the house 102 from the power lines 120. The power lines 120 are connected from the header 106 through power lines 214 to a power meter 202 mounted on a power box 212. The power box 212 is usually placed on an outside wall 101 of the house 102.

The power lines 214 is also connected to a house power distribution box 204 which usually contain circuit breakers that provide over-current protection for house power lines. A neutral reference point is established by a ground connection 206 that connects the neutral reference point to earth ground.

Figure 3:
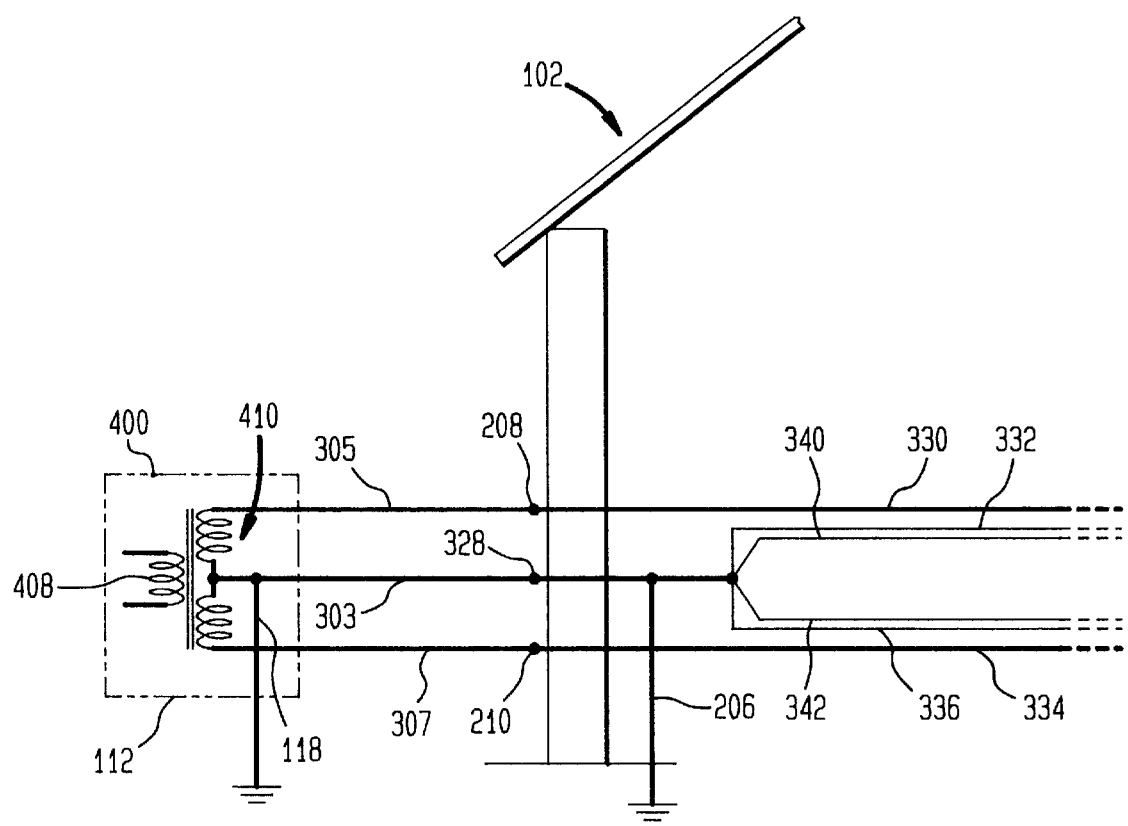
FIG. 3 shows an electrical diagram of connections between a power transformer and power lines of a house.

FIG. 3 shows a circuit diagram of the power line connections for the house 102. The power transformer 112 includes a primary coil 408 which is connected to high voltage power lines 116 and two secondary coils 410 which provide power to power lines 305 and 307 that supplies power to the house 102. A central connecting point between the two secondary coils 410 is connected to earth ground by the ground connection 118. The earth ground connection 118 may be made by a stake into the ground.

Power is supplied to the house 102 by three line connections, two power lines 305 and 307 and a neutral line 303. As shown in FIG. 3, the power lines 305 and 307 have two nodes 208 and 210, respectively, and the neutral line 303 has a node 328. The 240 volts AC appears between power lines 305 and 307. Thus, for a conventional house connection, the voltage between nodes 208 and 210 is 240 volts AC. The node 328 is a neutral reference node and the voltage on power lines 305 and 307 oscillates at 60 Hz above and below a voltage of the neutral reference node. As shown in FIG. 3, the neutral reference node 328 is connected to ground via the ground connection 118 at the transformer and the ground connection 206 within the house. Thus, the voltage between nodes 208, 210 and 328 is 120 volts AC. The voltage phases of nodes 208 and 210 are 180 degrees apart.

Internal to the house 102, power lines 330 and 334 (black wires) are connected to nodes 208 and 210. The neutral reference node 328 is usually connected in the house as white wires 332 and 336 and bare wires 340 and 342. The white wires 332 and 336 are neutral lines and the bare wires 340 and 342 are ground lines. Thus, each plug within the house 102 has three sockets. A first socket is connected to one of the black wires 330 or 334, a second socket is connected to one of the white wires 332 or 336 and a third socket is connected to one of the bare wires 340 or 342.

The above described power lines 114, 116, 120, 121, 305 and 307 may be used for communications by modulating communication signals onto the power lines 305 and 307. Communication signals may operate in frequencies between about 10 MHz and 30 MHz and power line transmitter/receivers operating in this frequency range may be placed near the power meter 202 to receive and transmit signals to/from the power lines 305 and 307 of all houses 102 and 104 that are connected by all the other power lines 114, 116, 120 and 121. However, noise generated by devices such as home appliances degrade the performance of the power line transmitter/receivers. Thus, blocking circuits are used to prevent such noise to affect the power line transmitter/receivers.

Because the power lines 330 and 334 form two separate power sources, noise may be independently generated in each of the power lines 330 and 334 relative to ground. Devices connected to the power lines cause the voltage of the neutral reference node 328 and a ground node established by an RF blocking circuit to vary. This in turn compromises the ability of the blocking circuit to block house noise from the power lines 305 and 307 in the desired communication frequency band(s). However, the effectiveness of the blocking circuit may be improved by forcing the voltages of the neutral reference node 328 and the ground node to be substantially identical.

Conventionally at low frequencies, the voltage of the neutral reference node and the voltage of the ground node is forced to be identical by a wire connecting the two terminals. However, the wire is inductive. Since the power line communication system may operate in an RF frequency band between about 10 MHz and 30 MHz, the wire inductance electrically separates the neutral reference node and the ground node for the frequency of interest. Thus, a difference voltage occurs between two ends of the wire which results in poor performance of the blocking circuit for RF signals. This voltage difference may be reduced by replacing the wire with an active circuit that drives the ground node to maintain the voltage of the ground node to be substantially equal to the voltage of the neutral reference node 328.

Figure 4:
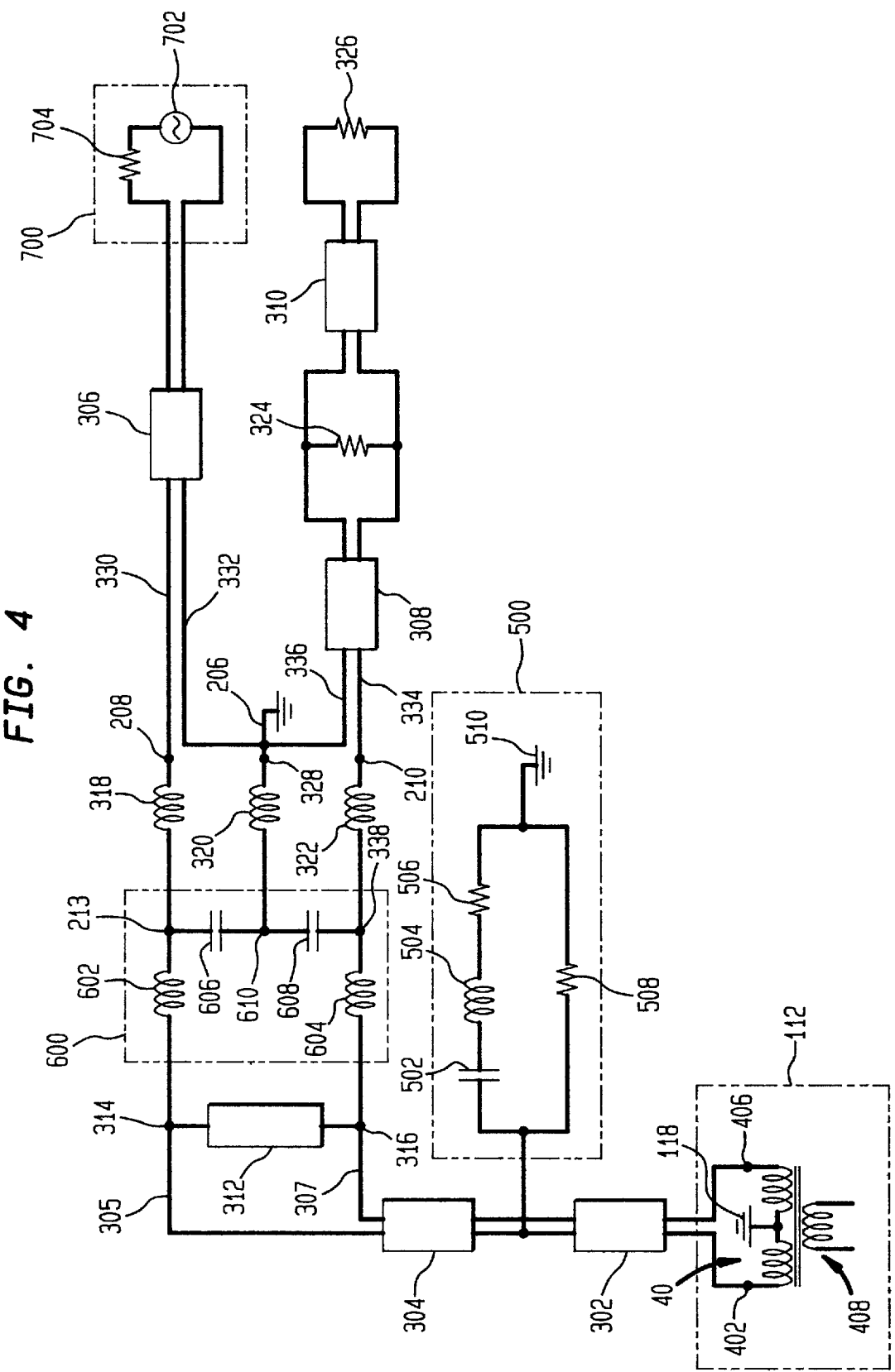
FIG. 4 shows a simulation model of a circuit from the power transformer to devices in a house.

FIG. 4 shows a simulation model of the circuit between the power transformer 112 and the house 102. This simulation model includes models for extended line connections represented by blocks 302, 304, 308, 306 and 310. In addition, models for the street lamp 110 (model 500), a power line transmitter/receiver 312 and a blocking circuit 600 are also included. The loads within the house 102 such as home appliances are modeled by a noise generator 700 and resistive loads 324 and 326.

The power lines 402 and 406 from the power transformer 112 are connected to the house 102 through the blocks 302 and 304. The power line transmitter/receiver 312 is connected to the power lines 305 and 307 at nodes 314 and 316. The blocking circuit 600 separates the power lines 330 and 334 within the house 102 from the power lines 305 and 307 outside the house 102 so that noise generated from within the house is blocked from being transmitted onto power lines 305 and 307 and the impedance variations of the house in the communications band(s) are isolated from power lines 305 and 307.

The blocking circuit 600 includes in-line inductors 602 and 604 as well as shunting capacitors 606 and 608. The shunting capacitors 606 and 608 are connected between nodes 213 and 338 and establish a ground node 610. Inductances 602 and 604 may have values of about 2 $\mu$H and the shunting capacitors 606 and 608 may have values of about 0.05 $\mu$F. These values are practical for the currents and voltages of the AC power system.

The nodes 213 and 338 are connected to the internal house power lines 330 and 334 at nodes 208 and 210 via wires which have inductances represented by inductors 318 and 322. The ground node 610 is also connected by a wire to the neutral reference node 328. This wire has an inductance represented by the inductor 320.

Figure 5:
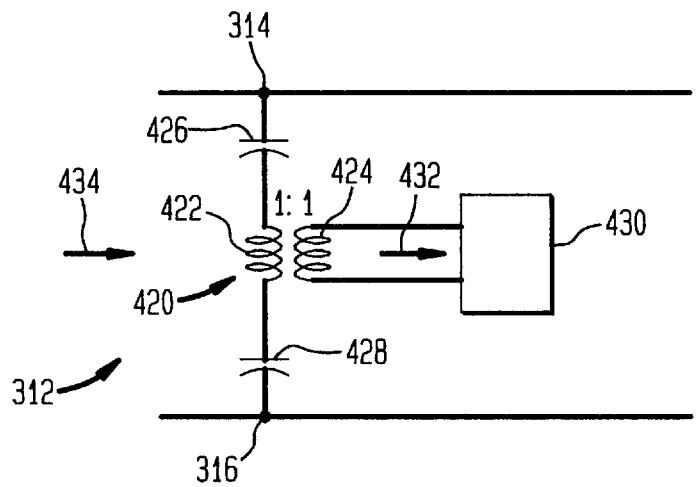
FIG. 5 shows a diagram of a power line receiver.

FIG. 5 shows a diagram of the power line transmitter/receiver 312. The power line transmitter/receiver 312 is coupled to the power lines 305 and 307 through impedance transformer 420 and coupling capacitors 426 and 428. The impedance as seen from nodes 314 and 316, indicated by the arrow 434, is equal to the impedance of the receiver 430 as seen in the direction indicated by arrow 432. The transformer 420 transforms the receiver impedance to match the impedance of the power lines 305 and 307 at nodes 314 and 316 so that maximum communication signal power transfer is achieved. Typically, the power line impedance is about 75 ohms in the RF frequency range. Thus, if the impedance of the receiver 430 is other than 75 ohms, the transformer ratio indicated as 1:1 is adjusted so that the impedance appearing between nodes 314 and 316 matches the power line impedance.

Figure 6:
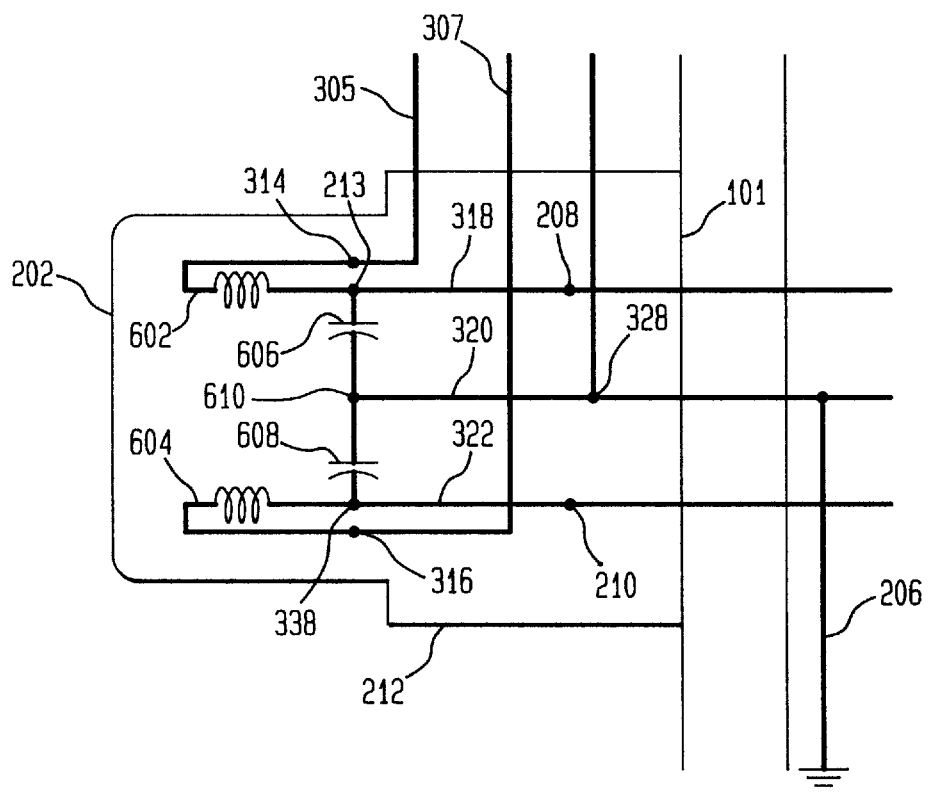
FIG. 6 shows a diagram of a blocking circuit disposed in the power meter.

FIG. 6 shows the blocking circuit 600 disposed in the power box 212 and the power meter 202. The power meter 202 is a glass meter conventionally appearing at the power line connections of the house 102. The power lines 305 and 307 are brought down from the header 106, for example, and connected to inductors 602 and 604, respectively. Nodes 314 and 316 are at the header side of the inductors 602 and 604 and nodes 213 and 338 are at the house side of the inductors 602 and 604, respectively. The inductors 602 and 604 and the shunting capacitors 606 and 608 may be physically disposed in the power meter 202. Nodes 213, 610 and 338 are connected to nodes 208, 328 and 210 by inductors 318, 320 and 322. Because the connections between nodes 213 and 208; 610 and 328; and 338 and 210, are about ten inches in a conventional house connection, the inductance values of the inductors 318, 320 and 322 are around 0.15 $\mu$H depending on wire layout.

At the frequency band of interest, inductors 318, 320 and 322 separate the nodes 213, 208; 610, 328; and 338, 210. The electrical separation between nodes 213, 208 and 338, 210 does not affect the operation of either the house appliances or the power line transmitter/receiver 312. However, the electrical separation between the nodes 610 and 328 affects the noise shunting ability of the shunting capacitors 606 and 608.

Figure 7:
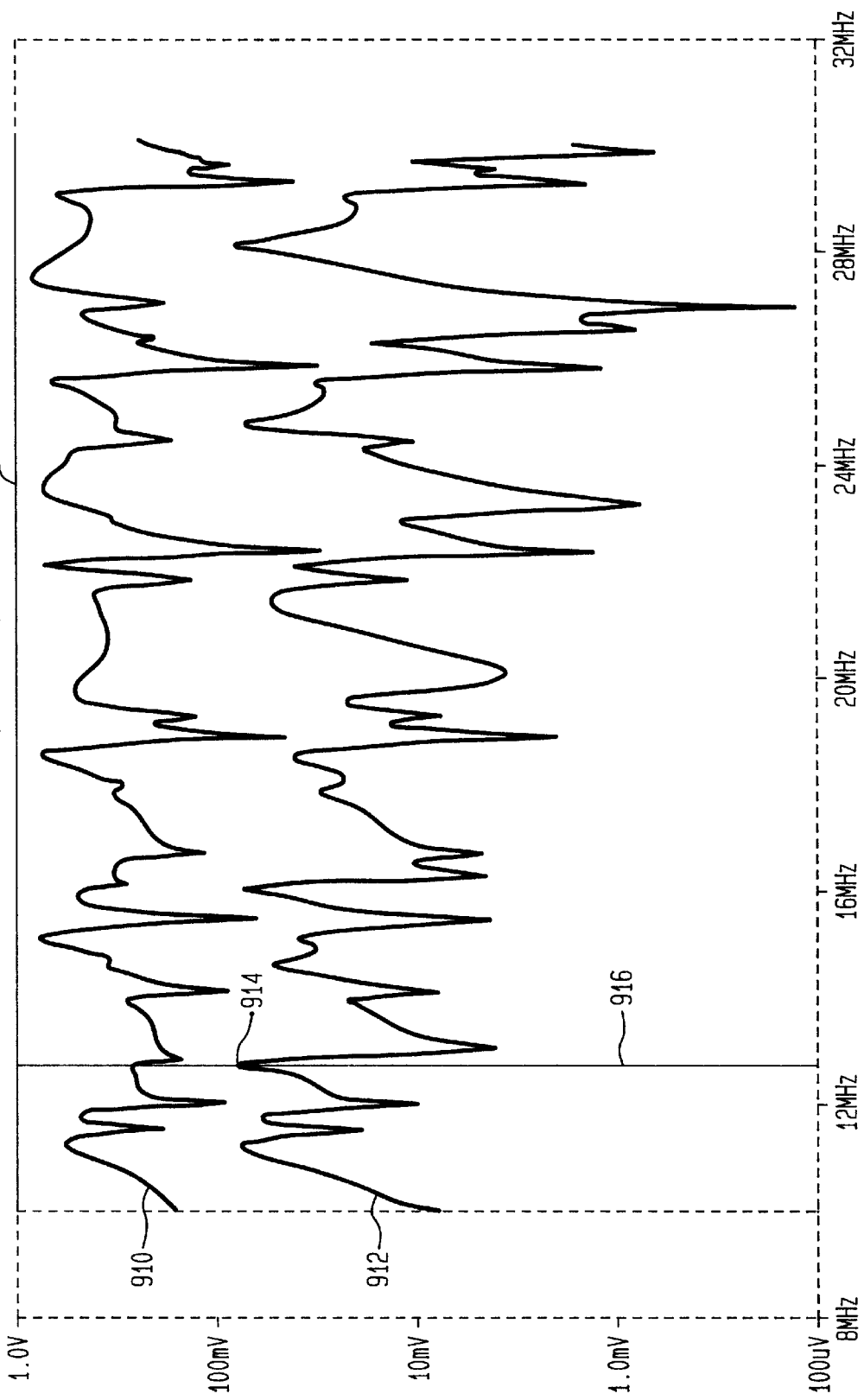
FIG. 7 shows voltage spectra for a voltage at a ground node and a difference voltage between the power lines.

FIG. 7 shows voltage spectra 910 and 912 for the voltage appearing at the ground node 610 (910) and the difference voltage between the nodes 213 and 338 (912). The voltage spectra in FIG. 7 are simulated based on a one volt AC signal 918 generated by a noise source such as noise source 700. For a frequency band of interest such as around 12 MHz as indicated by the vertical line 916, a maximum voltage of about 86 mv occurs at the point 914.

Figure 8:
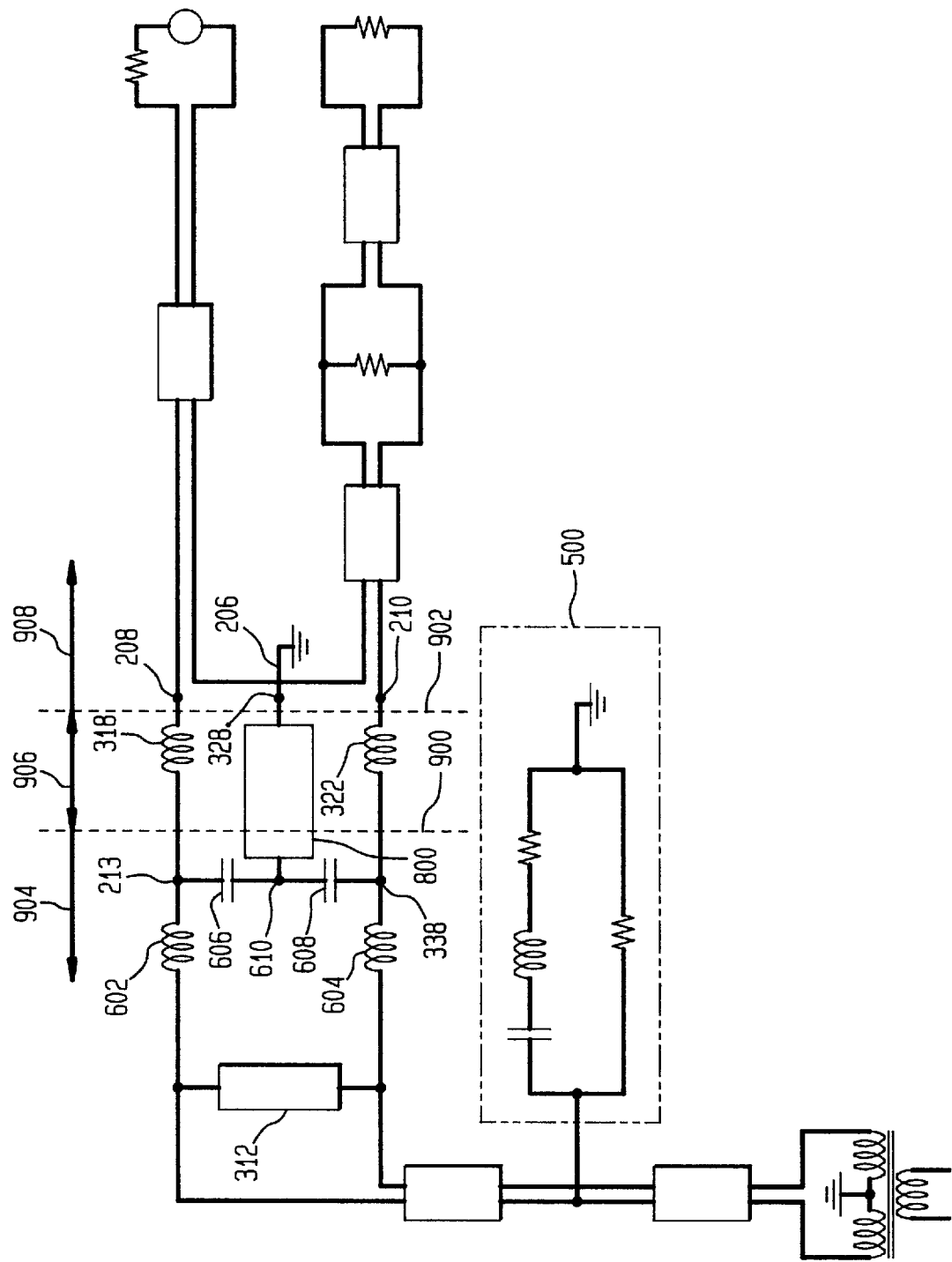
FIG. 8 shows a ground voltage reduction device connected between the ground node and a neutral reference node.

FIG. 8 shows a preferred embodiment of a ground voltage reduction device 800 connected between the ground node 610 and the neutral reference node 328. The ground voltage reduction device 800 reduces the voltage difference between the neutral reference node 328 and the ground node 610 by driving the ground node 610 based on a neutral reference voltage at the neutral reference node 328. Thus, by driving the ground node 610 in the above manner, the adverse effects of the inductor 320 is removed and the voltage value of the ground node 610 is made to be substantially equal to the neutral reference voltage at the neutral reference node 328.

FIG. 8 also shows that the ground voltage reduction device 800 physically spans the distance separating the ground node 610 and the neutral reference node 328. As indicated by the arrows 904, 906 and 908, the ground voltage reduction device 800 is connected to the ground node 610 at the ground node side 904 and also connected to the neutral reference node 328 at the neutral reference location 908. Thus, the ground voltage reduction device spans the space 906 (about 10 inches, for example) between the ground node 610 and the neutral reference node 328.

Figure 9:
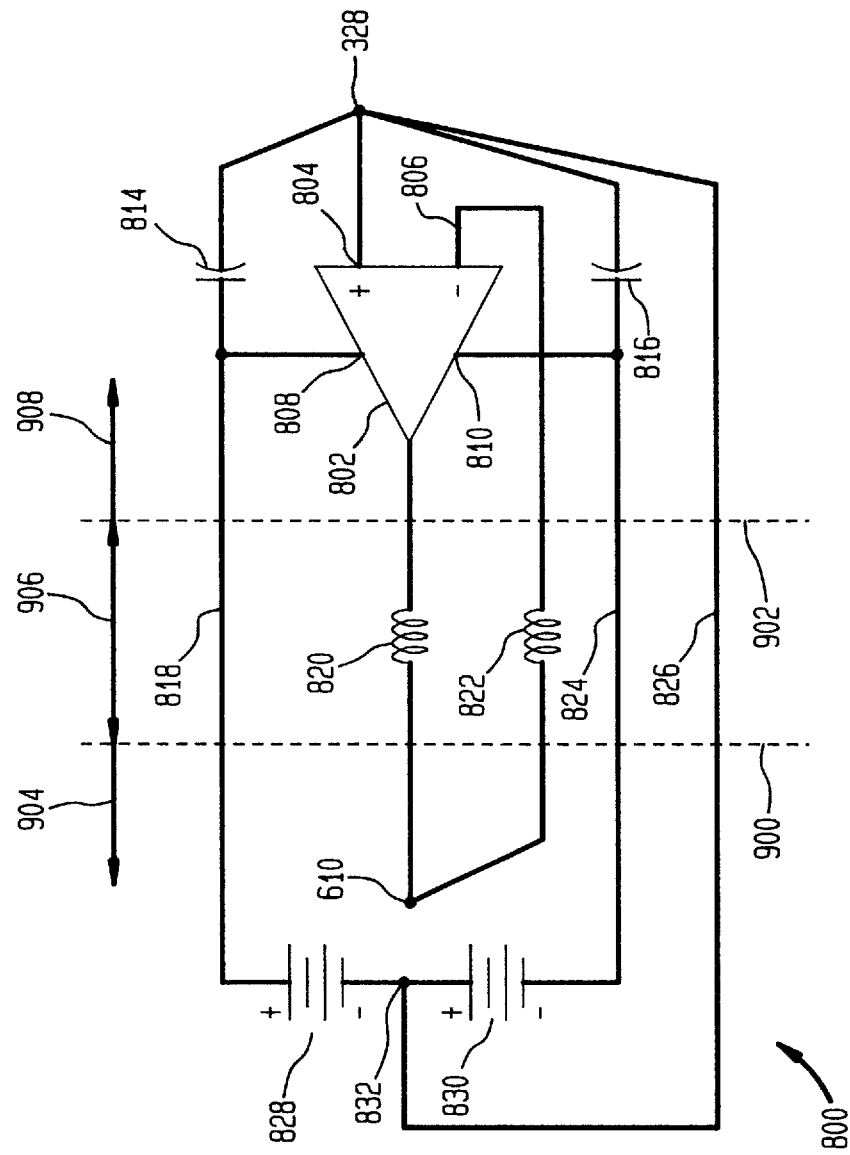
FIG. 9 shows a circuit diagram of the ground voltage reduction device.

FIG. 9 shows an exemplary embodiment of the ground voltage reduction device 800. The ground voltage reduction device 800 includes a voltage follower circuit connected between the neutral reference node 328 and the ground node 610. The voltage follower includes a buffer amplifier 802 having two input terminals 804 and 806 and an output terminal 812. Input terminal 804 is a positive high-impedance input terminal connected to the neutral reference node 328. The input terminal 806 is a negative high-impedance input terminal connected to the ground node 610 through a long wire that extends through the separation space 906 between the ground node 610 and the neutral reference node 328. This long wire acts as an inductor 822 that corresponds in value to the inductor 320. The output terminal 812 is also connected to the ground node 610 crossing the separation 906 and acts as an inductor 820.

Because the input terminals 804 and 806 are high input impedance terminals, the current flowing between the input terminal 804 and neutral reference node 328 and between the input terminal 806 and the ground node 610 are substantially zero. As shown in FIG. 9, the buffer amplifier 802 is placed in a physical location very near the neutral reference node 328. Thus, the voltage at the input terminal 804 is substantially identical to the voltage at the neutral reference node 328.

Because the input terminal 806 is a very high impedance terminal, there is substantially no current flowing between the input terminal 806 and the ground node 610. Thus, because the current flow between the input terminal 806 and the ground node 610 is substantially zero, the voltage at the input terminal 806 is substantially equal to the voltage at the ground node 610, thus substantially eliminating any voltage drop effect caused by the inductor 822.

The buffer amplifier 802 is a broad band buffer amplifier and responds to the signals in the power line signal transmitter/receiver's frequency band (for example, 10 MHz–30 MHz). Thus, when the voltages between the input terminals 804 and 806 are different, the output 812 drives the ground node 610 through the inductor 820. Because the output voltage range of the buffer amplifier 802 is large relative to the voltage difference that normally appears between the ground node 610 and the neutral reference node 328, the buffer amplifier 802 is able to drive the voltage at the ground node 610 to match the voltage at the neutral reference node 328.

The buffer amplifier 802 is powered by two power sources 828 and 830. As shown in FIG. 9, the power sources 828 and 830 may be physically located near the ground node 610. As can be seen from FIG. 6, the ground node 610 is located within the power meter 202 and has ready access to the nodes 213 and 338 or nodes 314 and 316 from which to receive power. While FIG. 9 shows the power sources 828 and 830 located near the ground node 610, other physical locations such as near nodes 208 and 210 may also be possible depending on the circumstances of a particular implementation.

The power sources 828 and 830 are connected in series having a reference point 832. A positive terminal of the power source 828 is connected to a power input terminal 808 of the buffer amplifier 802 and a negative terminal of the power source 830 is connected to the power terminal 810 of the buffer amplifier 802. The reference terminal 832 is connected to the neutral reference node 328.

The power terminals 808 and 810 of the buffer amplifier 802 are shunted to the neutral reference node 328 by capacitors 814 and 816. The capacitors 814 and 816 maintains the voltages of the power terminals 808 and terminal 810 of the buffer amplifier 802 at fixed values relative to the neutral reference node 328 in the frequency band of interest.

The capacitors 814 and 816 may have values of 2.2 $\mu$F. The capacitors 814 and 816 are physically located very close to the buffer amplifier 802 and the neutral reference node 328 so that the inductance values of the leads of the capacitors 814 and 816 are substantially zero. Thus, the capacitors 814 and 816 permit the power sources 828 and 830 to be located at distant locations from the buffer amplifier 802. In addition, the capacitors 814 and 816 together with power source noise rejection inherent in the buffer amplifier 802 prevent any noise that may appear at the power terminals 808 and 810 from substantially affecting the ability of the buffer amplifier 802 to maintain the voltage of the ground node 610 at the voltage of the neutral reference node 328.

Figure 10:
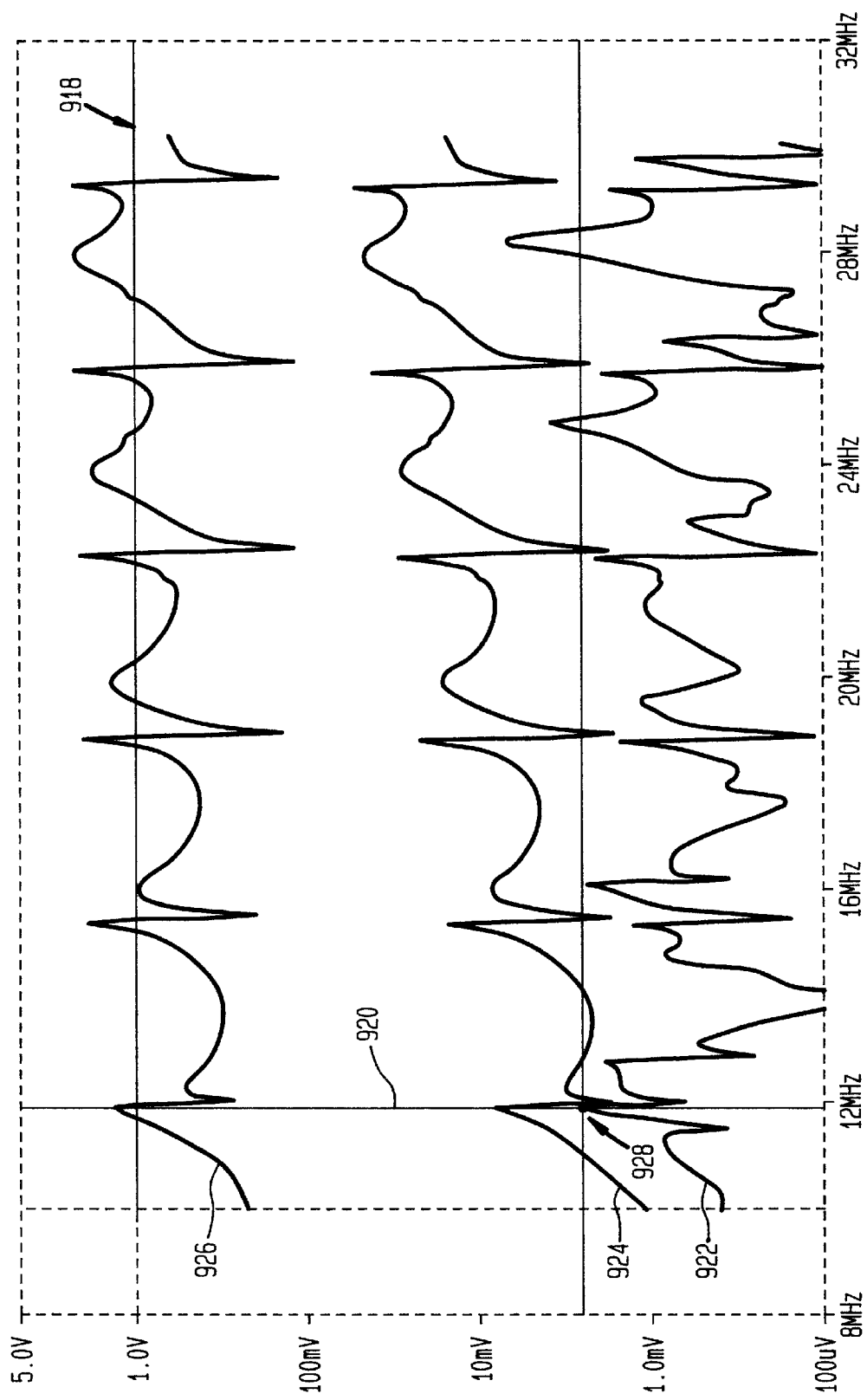
FIG. 10 shows voltage spectra of the ground node and a difference voltage between the power lines after incorporating the ground voltage reduction device.

FIG. 10 shows voltage spectrum 926 of the output terminal 812 of the buffer amplifier 802; the voltage spectrum 924 of the ground node 610; and the difference voltage spectrum 922 of the voltage difference between nodes 314 and 316 which appears at the inputs of the power line signal transmitter/receiver 312. Comparing FIG. 10 with FIG. 7, the peak voltage of the voltage spectrum 922 in the frequency band around 12 MHz is 2.6 mv at the point 928 as shown in FIG. 10. The 2.6 mv is more than 30 times lower than the 86 mv shown in FIG. 7. Thus, the ground voltage reduction device 800 significantly reduces the voltage difference between the ground node 610 and the neutral reference node 328 which greatly improves the performance of the blocking circuit 600 in reducing RF noise at receiver 312.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A ground voltage reduction device, comprising:
 a ground node disposed at a first location;
 a neutral reference node disposed at a second location, the neutral reference node being coupled to the ground node through power lines and at least one device connected at one point to one of the power lines and at another point to the neutral reference node, the first and the second locations being separated; and
 an active circuit connected between the ground node and the neutral reference node, wherein the active circuit reduces a voltage between the ground node and the neutral reference node by driving the ground node based on a neutral reference voltage of the neutral reference node.

2. The device of claim 1, wherein a ground voltage of the ground node is established by a blocking circuit connected to the power lines at the first location, the power lines extending across a distance between the first and the second locations, the power lines at the first location being electrically separated from the power lines at the second location by inductances of the power lines.

3. The device of claim 2, wherein the active circuit comprises:

a power supply; and a buffer circuit receiving power from the power supply, wherein the buffer circuit inputs the neutral reference voltage from the neutral reference node and drives the ground node with an output signal based on a difference between the neutral reference voltage and a voltage of the ground node at the first location.

4. The device of claim 3, wherein the power supply is disposed at the first location and the buffer circuit is disposed at the second location, a reference terminal of the power supply being connected to the neutral reference node.

5. The device of claim 4, wherein the buffer circuit comprises:

an input terminal connected to the neutral reference node;

an output terminal coupled to the ground node; and a feedback input terminal coupled to the ground node, wherein the output terminal being electrically separated from the ground node by a first inductance and the feedback input terminal being electrically separated from the ground node by a second inductance.

6. The device of claim 5, wherein the buffer circuit is a voltage follower circuit, the input terminal being a positive input of the voltage follower circuit and the feedback input terminal being the negative input of the voltage follower circuit.

7. The device of claim 6, wherein the voltage follower is a broadband buffer amplifier, the input terminal and the feedback input terminal having high input impedances and the output terminal having low output impedance for a frequency band of interest.

8. The device of claim 3, wherein the power supply comprises:

a first power supply circuit having a first positive terminal and a first negative terminal; and a second power supply circuit having a second positive terminal and a second negative terminal, wherein the first positive terminal is connected to a positive power terminal of the buffer circuit and the second negative terminal is connected to a negative power terminal of the buffer circuit, the first negative terminal and the second positive terminal being connected to the neutral reference node.

9. The device of claim 8, further comprising:

a first capacitor connected between the positive power terminal of the buffer circuit and the neutral reference node; and a second capacitor connector between the negative power terminal of the buffer circuit and the neutral reference node.

10. A method for reducing ground voltage, comprising:

connecting an active circuit between a ground node located at a first location and a neutral reference node located at a second location, the ground node and the neutral reference node being coupled together through power lines and at least one device connected at one point to one of the power lines and at another point to the neutral reference node, the first and second locations being separated; and reducing a voltage between the ground node and the neutral reference node by driving the ground node using an active circuit based on a neutral reference voltage of the neutral reference node.

11. The method of claim 10, wherein the step of connecting the active circuit further comprises:

connecting to the neutral reference node a power supply; and connecting a buffer circuit to the power supply, the buffer circuit receiving power from the power supply, wherein the buffer circuit inputs the neutral reference voltage from the neutral reference node and drives the ground node with an output signal based on a difference between the neutral reference voltage and a voltage of the ground node at the first location.

12. The method of claim 11, further comprising:

connecting an input terminal of the buffer circuit to the neutral reference node;

connecting an output terminal of the buffer circuit to the ground node; and connecting a feedback input terminal of the buffer circuit to the ground node, wherein the output terminal being electrically separated from the ground node by a first inductance and the feedback input terminal being electrically separated from the ground node by a second inductance, the buffer circuit receiving the neutral reference voltage of the neutral reference node and driving the ground node with an output signal based on a difference between the neutral reference voltage and a voltage of the ground node.

13. The method of claim 12, further comprising:

configuring the buffer circuit as a voltage follower circuit, with the input terminal being a positive input of the voltage follower circuit and the feedback input terminal being the negative input of the voltage follower circuit.

14. The method of claim 13, further comprising:

connecting the voltage follower circuit using a broadband buffer amplifier, the input terminal and the feedback input terminal having high input impedances and the output terminal having low output impedance for a frequency band of interest.

15. The method of claim 11, further comprising:

connecting a first positive terminal of a first power supply circuit of the power supply to a positive power terminal of the buffer circuit;

connecting a second negative terminal of a second power supply circuit of the power supply to a negative power terminal of the buffer circuit; and connecting a first negative terminal of the first power supply circuit and a second positive terminal of the second power supply circuit to the neutral reference node.

16. The method of claim 15, further comprising:

connecting a first capacitor between the positive power terminal of the buffer circuit and the neutral reference node; and connecting a second capacitor between the negative power terminal of the buffer circuit and the neutral reference node.

* * * * *